C. BERNINGER.
Soil Pulverizer.
No 81,333.
Patented Aug. 25, 1868.
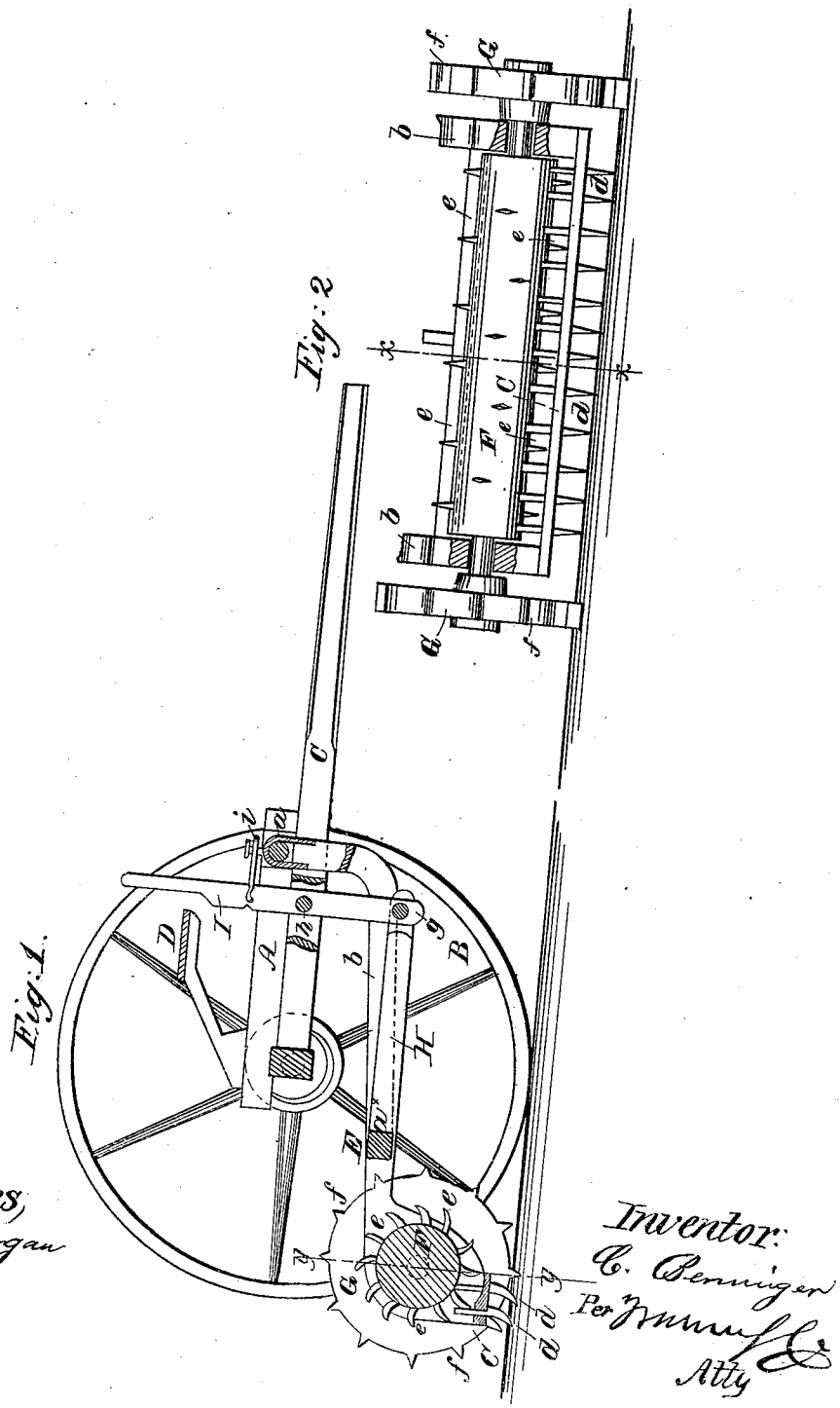

United States Patent Office.

CORNELIUS BERNINGER, OF MIER, ILLINOIS, ASSIGNOR TO HIMSELF, WILLIAM FRIEND, AND GEORGE L. BAILEY, OF SAME PLACE.

Letters Patent No. 81,333, dated August 25, 1868.

IMPROVEMENT IN SOIL-PULVERIZER.

*The Schedule referred to in these Letters Patent and making part of the same.*

TO ALL WHOM IT MAY CONCERN:

Be it known that I, CORNELIUS BERNINGER, of Mier, in the county of Wabash, and State of Illinois, have invented a new and improved Soil-Pulverizer; and I do hereby declare that the following is a full, clear, and exact description thereof, which will enable those skilled in the art to make and use the same, reference being had to the accompanying drawings, forming part of this specification.

This invention relates to a new and improved device for pulverizing the soil, and it consists in a novel combination of a rotary-toothed pulverizer and a harrow fitted in a swinging or suspended frame, and attached to a mounted frame, all arranged in such a manner as to admit of the soil being pulverized in an expeditious and perfect manner.

In the accompanying sheet of drawings—

Figure 1 is a side sectional view of my invention, taken in the line $x\ x$, fig. 2.

Figure 2, a transverse vertical section of the same, taken in the line $y\ y$, fig. 1.

Similar letters of reference indicate corresponding parts.

A represents a frame, which is mounted on the wheels B B, and has a draught-pole, C, attached to it, and a driver's seat, D.

E is a frame, which is attached or suspended to the front part of the frame A by joints, $a$, said frame being composed of the side-pieces $b$, which extend downward a certain distance, then extend backward nearly horizontally, and then extend downward, the lower ends of said side-pieces having a horizontal bar, $c$, attached, which is provided with harrow-teeth $d$.

Directly above this harrow there is a cylinder, F, the periphery of which is provided with teeth $e$, the journal of the cylinder having its bearings in the side-pieces $b$, and extending through said side-pieces, with a wheel, G, keyed on each end.

The peripheries of the wheels G G are provided with teeth or spuds, $f$, to prevent them from slipping.

To a cross-bar, $a^\times$, of the frame E, there is secured a bar, H, to the front end of which the lower end of a lever, I, is connected by a pivot, $g$, said lever I having its fulcrum $h$ in the draught-pole C.

This lever-attachment is for the purpose of raising the rear part of frame E whenever required, which may be readily done by the driver, as the top of lever I is within convenient reach of the driver on seat D, the lever being held by a hook, $i$, when it is necessary to keep the harrow above the surface of the ground.

The wheels G G support the rear part of the frame E, with its appendages or attachments, and as the machine is drawn along, the harrow-teeth $d$ pulverize the soil, while the teeth $e$ of the cylinder F break the clods of earth upon the surface.

The wheels G rotate the cylinder F, the teeth or spuds $f$ insuring the rotation of the cylinder, and preventing the same being choked or clogged by weeds, grass, or other trash, which might otherwise wedge in between its periphery and the bar $c$.

The device is extremely simple and efficient, and operates in a perfect manner.

I claim as new, and desire to secure by Letters Patent—

The harrow-teeth $d$ and toothed cylinder F, provided with the wheels G G, when said parts are applied or attached to a frame, E, suspended to a mounted frame, A, and all arranged substantially in the manner as and for the purpose set forth.

CORNELIUS BERNINGER.

Witnesses:
B. BAILEY,
D. SPITLER.